(12) United States Patent
Krishnaswamy

(10) Patent No.: US 10,587,529 B1
(45) Date of Patent: Mar. 10, 2020

(54) DYNAMIC SELECTION OF ROUTER GROUPS TO MANAGE COMPUTING INSTANCES

(71) Applicant: Amazon Technologies, Inc., Seattle, WA (US)

(72) Inventor: Shashanka Krishnaswamy, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/139,478

(22) Filed: Sep. 24, 2018

(51) Int. Cl.
| | |
|---|---|
| *G06F 9/50* | (2006.01) |
| *H04L 12/917* | (2013.01) |
| *H04L 29/08* | (2006.01) |
| *H04L 12/725* | (2013.01) |
| *H04L 12/26* | (2006.01) |

(52) U.S. Cl.
CPC .......... *H04L 47/76* (2013.01); *G06F 9/5077* (2013.01); *H04L 43/16* (2013.01); *H04L 45/308* (2013.01); *H04L 67/306* (2013.01); *H04L 67/322* (2013.01)

(58) Field of Classification Search
CPC ....... H04L 47/76; H04L 43/16; H04L 45/308; H04L 67/306; H04L 67/322; G06F 9/5077
See application file for complete search history.

(56) References Cited

U.S. PATENT DOCUMENTS

| | | | | |
|---|---|---|---|---|
| 2006/0287959 | A1* | 12/2006 | Blecken | G06Q 10/10 705/59 |
| 2016/0162666 | A1* | 6/2016 | Casey | G06F 9/45558 726/29 |
| 2017/0177413 | A1* | 6/2017 | Wisniewski | G06F 9/5055 |

* cited by examiner

*Primary Examiner* — Kim T Nguyen
(74) *Attorney, Agent, or Firm* — Lee & Hayes, P.C.

(57) ABSTRACT

This disclosure describes techniques implemented partly by a service provider network for dynamically selecting between router groups to account for scaling up and/or scaling down of managed instances that are serving concurrent requests. Router groups define bandwidth allowances for routers that restrict the number of machine instances the routers are allowed to manage for individual user accounts. As concurrency of requests increases for a user account, rather than using more routers in a router group with a smaller bandwidth allowance, the techniques described herein include selecting a different router group for the user account that defines larger bandwidth allowances for user accounts. The service provider network may determine that the number of concurrent requests for a user account has passed a threshold for a router group, and select a new router group for routing new requests and managing containers of instances that are processing the existing concurrent requests.

20 Claims, 12 Drawing Sheets

DYNAMIC SELECTION OF ROUTER GROUPS TO MANAGE COMPUTING INSTANCES

BACKGROUND

Service provider networks offer network-based services to fulfill users' computing-service needs without the users having to invest in and maintain computing infrastructure required to implement the services. These service provider networks may provide network-based computing resources on an as-needed basis. For example, a service provider network may permit users to purchase and utilize computing resources such as virtual machine ("VM") instances, data storage resources, database resources, networking resources, network services, and other types of computing resources. Users may configure the computing resources provided by a service provider network to implement desired functionality, such as to provide a network-based application or another type of functionality.

Managing scalable computing resources provided by a service provider network such as those described above can be complex. For example, in order to service the variable amounts of requests received from users to execute commands within VM instances, the service provider network may need to scale up or down the number of VM instances. Further, the service provider network may need to route the requests to the appropriate VM instances, such as VM instances that are allocated for use by a particular user. The process of routing varying amounts of requests to the appropriate VM instances to serve the requests (e.g., execute a command) may also require scaling up or down the number of routers that are responsible for routing the requests to the VM instances. However, as the number of routers needed to route requests from users to appropriate VM instances scales up or down, various inefficiencies may be experienced in the service provider network.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

Figure 1A:
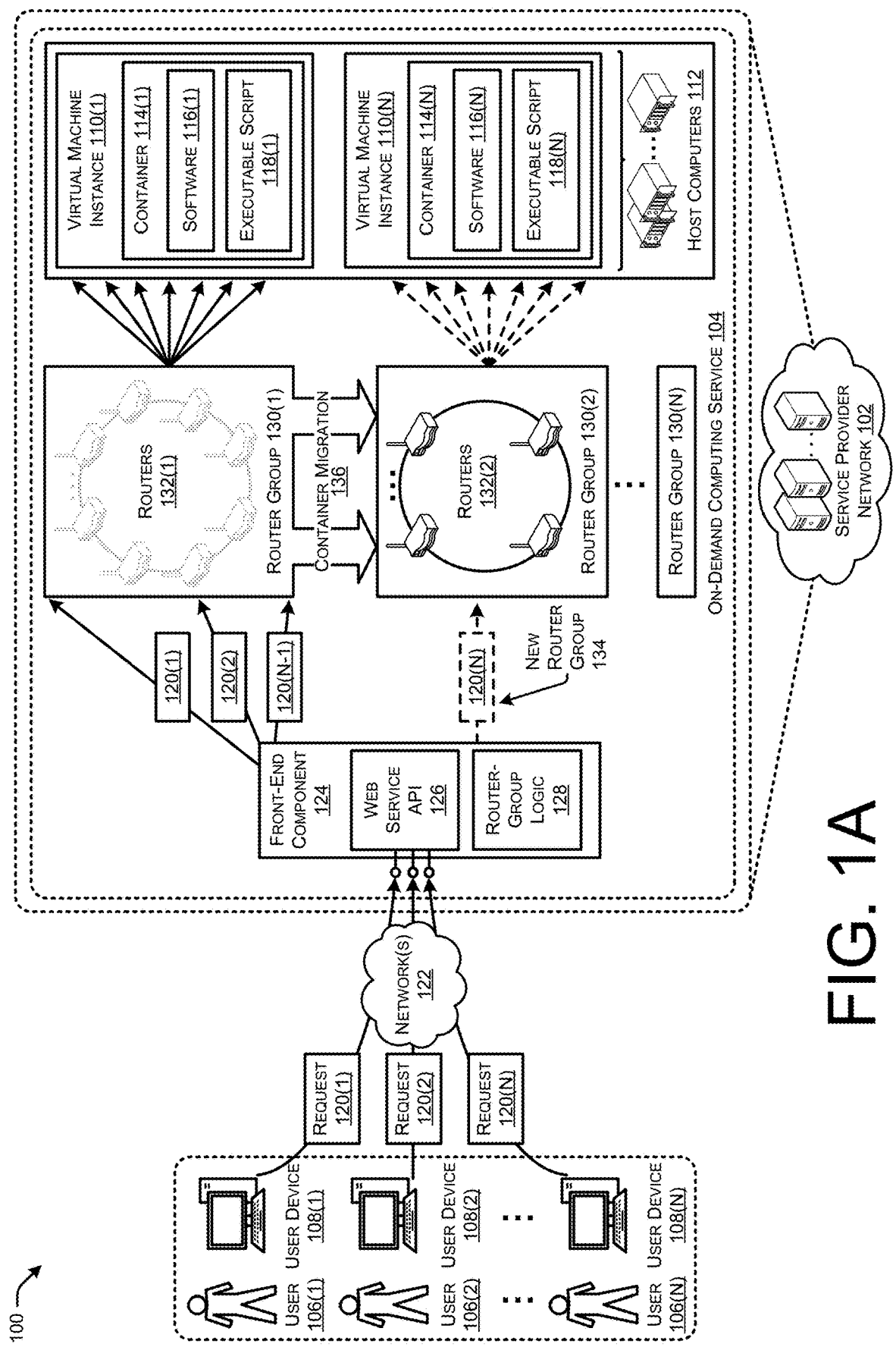
FIG. 1A illustrates a system-architecture diagram of an example environment in which a service provider network dynamically selects between router groups of an on-demand computing service based partly on a number of concurrent requests from a user account increasing above a threshold.

This disclosure describes, at least in part, techniques for dynamically selecting between router groups of a service provider network to account for scaling up and/or scaling down of managed instances that are serving concurrent requests. In some examples, service provider networks include routers that manage groups machine instances, such as virtual machine instances, according to different bandwidth allowances for users. For example, routers that are included in a router group that serve requests from a smaller user may have 10% of their bandwidth allocated to manage VM instances for the smaller user, whereas routers included in a router group for larger user may have 50% of their bandwidth allocated to manage VM instances for the larger user. Rather than assigning users for use of routers that are included in a single router group, the techniques described herein include determining that a number of concurrent requests being serviced by VM instances that are managed by a router group is greater than a threshold number of concurrent requests for that router group, and dynamically migrating the concurrent requests for the user to be managed by routers in a router group that have higher bandwidth allocated for users. In this way, the techniques described herein may reduce the number of routers required by users to service concurrent requests, and thus the amount of fragmentation amongst routers.

Service provider networks, such as cloud-based service provider networks, provide network-based computing resources on an as-needed basis. For example, a service provider network may permit users to purchase and utilize scalable computing resources such as virtual machine ("VM") instances, data storage resources, database resources, networking resources, network services, and other types of computing resources. Generally, users register for users accounts with the service provider network and purchase, or otherwise reserve, a number of machine instances required to serve (e.g., process, execute, etc.) a maximum number of concurrent requests. For example, a user may request that the service provider network reserve or allocate VM instances to be readily available to be spun up, or called, to serve a maximum number of concurrent requests that are served at least partially at a same time. While the techniques described herein are equally applicable to any computing instance, machine instance, or computing resource, the techniques are herein described with reference to VM instances.

A service provider network may manage large fleets of VM instances, which may be simulations of physical machines, such as a workstation or a server, that run on hosts that support virtualization. Each VM instance that is allocated or designated for a user may store a container, or a portable software environment for applications (or other software) to easily run and scale to process a request from a user. These containers may be portable in that they are capable of being migrated between VM instances. In some examples, a single VM instance may include one container that executes software or applications to process requests received for a user account. Accordingly, if a user has requested that the service provider network allocate a concurrency limit of 100 for their user account, then the service provider network may ensure that 100 VM instances are dedicated to being scaled up for use by the user account to serve, execute, or process 100 concurrent requests. However, in some examples a VM instance may contain multiple containers to process multiple requests depending on the VM instance.

While the VM instances include the containers that execute the software that processes requests received from users, the service provider network may utilize routers to manage the VM instances. Generally, routers may be dedicated computing devices that function to route requests to VM instances to process requests for the appropriate user account, and manage the containers that are executing the software to serve the requests. The routers may be able to manage a certain amount of VM instances according to their total bandwidth (e.g., processing ability).

In some examples, the routers may be assigned, or mapped, to router groups that define how the bandwidth of the routers is allocated (e.g., split, sliced, etc.) for different user accounts. In this way, routers may be assigned to a router group based on how "dedicated" that router is for user accounts. As an example, a user account that requests a relatively small concurrency limit (e.g., 50 requests, 100 requests, etc.) may be assigned to, or mapped to, a router group whose routers allocate 1% of their bandwidth for use by 10 different customers. In an example where each router has a bandwidth to manage a total of 5000 VM instances, and a user account has a concurrency limit of 100 requests, then only two routers would be required to manage the VM instances for the user account (50 VM instances for each router). In this way, the service provider network may assign routers to router groups that define different dedicated bandwidth percentages, or allocations, for routers when processing requests for user accounts.

Traditionally, user accounts have been spread across or mapped to router groups based on consistent hashing. Depending on the number of concurrent requests (or "traffic") for the user account, the service provider network would scale up, or scale down, the number of routers to serve the user account. However, this may lead to fragmentation amongst routers, particularly when the routers in the router group are configured to allocate a relatively small portion of their bandwidth for a user account that is experiencing and processing a relatively high number of concurrent requests.

The techniques described herein include dynamically assigning or moving user accounts to different router groups based on a number of concurrent requests for the user account. For example, a user account may be assigned to a first router group that has routers that have a smaller portion of their bandwidth allocated for use by individual user accounts that routers in a second router group. The service provider network may assign each router group with an upper limit, or threshold, of concurrent requests that the router group is allowed or configured to process for user accounts. The service provider network, such as a front-end component and/or router(s), may determine that the number of concurrent requests for the user account has passed the upper threshold of concurrent requests being processed for the user account. Rather than scaling up additional routers that are assigned to the first router group and configured to allocate smaller portions of bandwidth for user accounts, the service provider network may migrate the user account, and associated concurrent requests, to be managed by the second router group.

To migrate the user account and associated concurrent requests from a first router group to be managed by the second router group, the service provider network may initially determine the number of concurrent requests being processed by the first router group, and also determine the number of requests that can be managed by routers in the second router group based on the bandwidth allocations of the routers. The service provider network may then "spin up" or otherwise configure the appropriate number of routers in the second router group to begin managing the concurrent requests. The service provider network may then migrate the concurrent requests that are being processed in containers of the VM instances to be managed by the routers in the second router group. For example, the service provider network may migrate the containers to be managed by the routers in the second router group, such as by sending snapshots of the containers to the routers in the second router group. The routers in the second group of routers may then begin managing the VM instances that are processing the concurrent requests. Additionally, in some examples as new requests come in, the front-end component may begin routing those requests to the routers in the second group, which in turn begin routing the new requests to VM instances and managing the containers that are processing the request on the VM instances.

In some examples, the number of routers in the second group that are managing the VM instances may be less the number of routers in the first group that were managing substantially similar amounts of VM instances. Accordingly, the number of routers that are spun up and working to manage substantially similar amounts of VM instances is less by migrating the user account to a different router group, which lessens fragmentation amongst routers and increases the efficiency in terms of power savings, processing, etc. While the routers in the second group of routers may be similar as far as processing power to the routers in the first group of routers, in some examples, the routers in the second group of routers may have additionally processing power, which may further reduce the number of routers needed, and increase the efficiency that the requests are routed and processed.

While the techniques described herein are with reference to VM instances, the techniques are equally applicable to any type of computing resource that has multiple instances or occurrences for processing concurrent commands or requests. For example, the techniques are equally applicable to a messaging service that receives messages, stores them in a queue, and processes concurrent requests for user accounts to retrieve and send those messages to other devices.

The techniques described herein improve the efficiency of service provider networks in various ways. For example, service provider networks are able to process requests or commands using lesser number of routing devices than traditional techniques. In this way, less routing devices may be spun up, which may reduce power requirements, reduce overall processing requirements due to baseline processing requirements to run the routing devices, reduce fragmentation among router groups, and improve the efficiency of processing requests or commands.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1A illustrates a system-architecture diagram of an example environment 100 in which a service provider network 102 dynamically selects between router groups of an on-demand computing service 104 based partly on a number of concurrent requests from users.

In some examples, the service provider network 102 may comprise clusters of managed servers stored in data centers located across geographic areas. The service provider network 102 may be a distributed network through which users 106 (often customers) may interact via user devices 108 to utilize computing resources, such as VM instances 110 and/or other types of computing resources, on a permanent or as-needed basis. In FIG. 1A, the users 106 may comprise users 106(1), 106(2), through 106(N) where N is any number greater than 2 (collectively referred to as "users 106"), that interact with the service provider network 102 via respective user devices 108(1), 108(2), through 108(N) (collectively referred to as "user devices 108"). The user devices 108 may be any type of computing device capable of connecting to the service provider network 102 via a suitable data communications network such as, but not limited to, a laptop or desktop computer, a tablet computing device, a server computer, or a mobile telephone. Administrative users 106 employed by the operator of the service provider network 102, such as administrators managing the operation of the service provider network 102, might also connect with, manage, and utilize resources provided by the service provider network 102 in a similar fashion.

Depending on the type of service provided by the on-demand computing service 104, each type or configuration of a computing resource may be available from the service provider network 102 in different sizes. For example, a service provider might offer physical hosts, VM instances 110 or other types of data processing resources that are available for purchase and use that have many different configurations of processor capabilities, main memory, disk storage, and operating system. A service provider operating the service provider network 102 might also offer other types of resources for purchase and use by users 106. For example, a service provider might offer virtual or hardware devices, database resources and instances, file or block data storage resources, and/or networking resources, such as load balancing resources, domain name service ("DNS") resources, virtual private cloud ("VPC") resources, virtual local area network ("VLAN") resources, and/or other types of hardware and software computing resources or services on a permanent or as-needed basis. The resources might also include, but are not limited to, VM instances 110 and images, security groups, option groups, gateways, option sets, network access control lists ("ACLs"), subnets, storage buckets, network interfaces, snapshots, spot market requests, and storage volumes.

The service provider operating the service provider network 102 might also charge a fee for utilization of the resources to a customer that creates and uses the resources. The fee charged for a particular computing resource might be based upon the type and/or configuration of the computing resource. For example, in the case of a data processing computing resource, like a VM instance 110, the fee for use of the computing resource might be charged based upon the amount of time the computing resource is utilized. In the case of a data storage computing resource, the fee might be computed based upon the amount of data stored and/or the amount of data transferred into or out of the computing resource. The fees for other types of resources might also be based upon other considerations. A service provider might also utilize various purchasing models to determine the amount to charge a customer for use of resources provided by the service provider network 102.

The resources described above may be provided in one particular implementation by one or more data centers operated by the service provider. As known to those skilled in the art, data centers are facilities utilized to house and operate computer systems and associated components. Data centers also typically include redundant and backup power, communications, cooling, and security systems. The data centers might be located in geographically disparate regions, and might also be connected to various other facilities, such as co-location facilities, and various wide area networks ("WANs"), such as the Internet.

The resources described briefly above might also be provisioned and de-provisioned as needed in an automated fashion. For example, the service provider network 102 might be configured to instantiate a new instance of a computing resource, such as a VM instance 110, in response to an increase in demand for a network service or other condition. Other types of computing resources might also be provisioned and de-provisioned in a similar manner. Services in the service provider network 102 might also provide functionality for automatically scaling and/or de-scaling resources based upon demand for the resources and/or other factors.

As shown in FIG. 1A, an on-demand computing service 104 is utilized in some configurations to provide the VM instances 110 for use by users 106. For instance, in the example shown in FIG. 1, the on-demand computing service 104 is providing at least multiple VM instances 110A and 110N where "N" is any integer greater than 2, that are executing on one or more host computers 112. In this regard, it should be appreciated that the configuration shown in FIG. 1A has been simplified for discussion purposes and that many other host computers 112 may be utilized to provide many other VM instances 110 in a similar fashion. For example, and without limitation, a host computer 112 might be utilized to provide a single VM instance 110, or additional VM instances 110. As discussed above, the VM instances 110 might also be provisioned and/or de-provisioned based upon demand and/or other factors.

The VM instances 110 may comprise various instance types including various combinations of CPU, memory, storage, and networking capacity. The VM instances 110 may be different instances sizes to allow scaling of resources. The instance types of the VM instances 110 may include general purpose instances to provide a baseline level of CPU performance that scale for temporary spikes in use; computing-optimized instances for compute-intensive workloads; memory-optimized instances for high-performance databases, in memory databased, etc.; accelerated-computing instances for machine learning, high-performance computing, etc.; and/or storage-optimized instances for local storage balancing and compute.

Generally, a user 106 may create an account with the service provider network 102 and enroll for use of the on-demand computing service 104. The on-demand computing service 104 may comprise a scalable container management service that allows the user 106 to run, stop and manage containers 114 stored in a cluster of VM instances 110. The VM instances 110 may each store one or more containers 114, which may be portable software environments for software 116 (such as applications) to easily run and scale to process a request from a user 106, such as by identifying an executable script 118 (or other type of program code) that corresponds to a requested command. Once the executable script 118 associated with the requested command has been identified, the software 116 causes the executable script 118 (or other type of program code for implementing the command) to be executed within the container 114 of the VM instance 110. The software 116 and/or command scripts 118 may be provided by users 106 via their use accounts, by a manager of the service provider network 102, and/or by third-party developers. The software 116 and command scripts 118 can generally be any type of executable program code that may be executed in a container 114 environment.

The containers 114 may be portable in that they are capable of being migrated between VM instances 110. In some examples, a single VM instance 110 may include one container 114 that executes software 116 or applications to process requests received for a user account. Accordingly, if a user 106 has requested that the service provider network 102 allocate a concurrency limit of 100 requests for their user account, then the service provider network 102 may ensure that 100 VM instances (in a one-to-one relationship) are dedicated to being scaled up for use by the user account to serve, execute, or process the 100 concurrent requests. However, in some examples a VM instance 110 may contain multiple containers to process multiple requests depending on the VM instance 110.

As noted above, the users 106 may register for an account with the on-demand computing service 104, and register (and potentially purchase) to have scalable processing of a concurrency limit for requests. Stated otherwise, a user 106 may pay for enough computing resources, such as VM instance 110, to be available to handle an upper limit of concurrent requests (e.g., 100 requests, 1,000 requests, 5,000 requests, etc.). The users 106 may submit requests 120 to execute or process commands in various ways, such as over one or more networks 122 and to a front-end component 124 of the on-demand computing service 104 that receives and manages the requests 120. For example, the front-end component 124 may include and expose a web service application programming interface (API) 126 to receive the requests 120 that include data identifying the executable scripts 118 (or commands) that may be executed within a particular VM instance 110. The requests 122 identifying the executable scripts 118 that can be executed within a VM instance 110 may be called by other components, such as through a command line interface ("CLI") operating within the service provider network 102.

The front-end component 124 may receive the requests 120, and determine a user account associated with the request 120. Further, the front-end component 124 may include router-group logic 128 configured to determine which router group 130 the user account is mapped to or associated with. Based on the user account being mapped to or otherwise associated with router group 130(1), the front-end component 124 may route the requests 120(1) to routers 132(1). In some examples, the routers 132 may be assigned, or mapped, to router groups 130 that define how the bandwidth of the routers is allocated (e.g., split, sliced, etc.) for different user accounts. In this way, routers 132 may be assigned to a router group 130 based on how "dedicated" that router is for user accounts. In some instances, user accounts and/or routers 132 may be assigned to a router group 130 using consistent hashing. In some examples, the routers 132 may be "multi-tenanted" meaning that the routers 132 can concurrently route requests 120 for different user accounts.

In the illustrated example, the user account associated with the request 120 may have a smaller concurrency limit (e.g., 50 requests, 100 requests, etc.) and may be assigned to, or mapped to, the router group 130(1) whose routers 132(1) allocate 1% of their bandwidth for use by the user account. In an example where each router 132(1) has a bandwidth to manage a total of 5000 VM instances 110, and a user account has a concurrency limit of 100 requests, then only two routers 132(1) would be required to manage the VM instances 110 for the user account (50 VM instances for each router 132(1)). As illustrated, the front-end component 124 may send the requests 120 to the router group 130(1) as long as the concurrent requests are less than 100, and the routers 132(1) may route the concurrent requests 120 to VM instances 110 and manage the execution of the appropriate executable scripts 118 in the containers 114.

However, according to the techniques described herein, the router groups 132 may be associated with concurrency limits that, if the number of requests being managed by the routers 132 in the router group 130 exceed the limit, the front-end component 124 and/or the routers 132 themselves may determine that the request 120 for that user account are to be managed by another router group 130. In some examples, the front-end component 124 may track the number of requests being concurrently managed by the routers 132 in a particular router group 130. For instance, the routers 132 may, continuously or periodically, notify the front-end component 124 of the number of requests 120 that they are managing concurrently. The front-end component 124 may track the number of concurrent requests for the routers 132, and determine whether the router group 130 is managing more than a limit, or threshold number of concurrent requests, for a user account assigned to the router group.

As illustrated in FIG. 1A, the front-end component 124, such as the router-group logic 128, may have been routing requests 120(1) through 120(N−1) to router group 130(1) such that the routers 132(1) in turn route the requests 120(1) through 120(N−1) to one or more VM instances 110 to be executed in the containers 114 (e.g., software and/or command scripts 116 being executed). In some examples, the routers 132 may further manage the containers 114. For instance, the routers 132 may be responsible for creating the containers 114, destroying the containers 114, routing the requests 120 to the containers 114, and waiting for new requests 120. Further, the routers 132 may at least periodically notify, or be prompted by, the front-end component 124 to indicate a concurrent number of requests 120 that the routers 132 are managing for a particular user account, or multiple user accounts.

The front-end component 124 may determine that the number of concurrent requests 120(N-1) being managed by the routers 132(1) in the router group 130(1) for a particular user account is greater than or equal to a threshold of concurrent requests 120 for the router group 130 and/or the user account. For instance, the router group 130(1) may be configured to manage no more than 100 concurrent requests, where routers 132(1) allocate bandwidth to support 10 requests per user account. Accordingly, if ten of the routers 132(1) are, on average, managing greater than or equal to 10 requests 120, then the routers 132(1) may be managing greater than or equal to the threshold number of software-execution requests 120 that the router group 130(1) is configured to manage for a particular user account.

In such examples, the front-end component 124 may transition the management of requests 120 for the user account to a new router group 132(2). For example, subsequently received requests 120(N) may be routed by the router-group logic 128 to a new router group at 134, such as router group 132(2). In various examples, the routers 132(2) in the router group 130(2) may be configured to allocate a larger portion of their bandwidth when routing requests 120 for a particular user account. For example, routers 132(2) may be configured to route 500 concurrent requests for individual user accounts, and thus provide a larger "slice" of their bandwidth for use by individual user accounts. In this way, less routers 132(2) are required to manage concurrent requests 120 in router group 130(2) than when routers 132(1) in router group 130(1) were managing the requests 120.

As requests 120 continue to come in the routers 132(2) in the router group 132(2) will continue to route the requests to VM instances 110 to execute corresponding commands in the containers 114. In addition to having the routers 132(2) being assigned to route requests 120 for the user account, the routers 132(1) may also perform container migration 136 where the containers 114 that are concurrently executing requests 120 have their management migrated to be performed by routers 132(2) in router group 130(2). The container migration 136 from routers 132(1) to routers 132(2) generally include sending metadata associated with the containers 114 that is used to manage the containers 114. For example, the routers 132(1) may send various metadata to the routers 132(2) for managing the containers 114, such as IP addresses for the containers 114, user account information, unique IDs for the containers 114, user information, software 116 and/or executable script 118 details, and so forth. In this way, the routers 132(2) are able to continue managing the containers 114 that are executing the commands for the concurrent requests 120.

In some examples, the container migration 136 may be performed on a per-user-account basis. Stated otherwise, the number of concurrent requests 120 may be counted for each user account, and the containers that are migrated during the container migration 136 may be the containers that are executing the concurrent requests 120 for that user account. Thus, the routers 132(1) may continue to route and manage requests 120 for other user accounts, while the container migration 136 may be performed for only the user account that has a number of concurrent requests 120 that is greater than or equal to the threshold number of request for the router group 130(1).

Figure 1B:
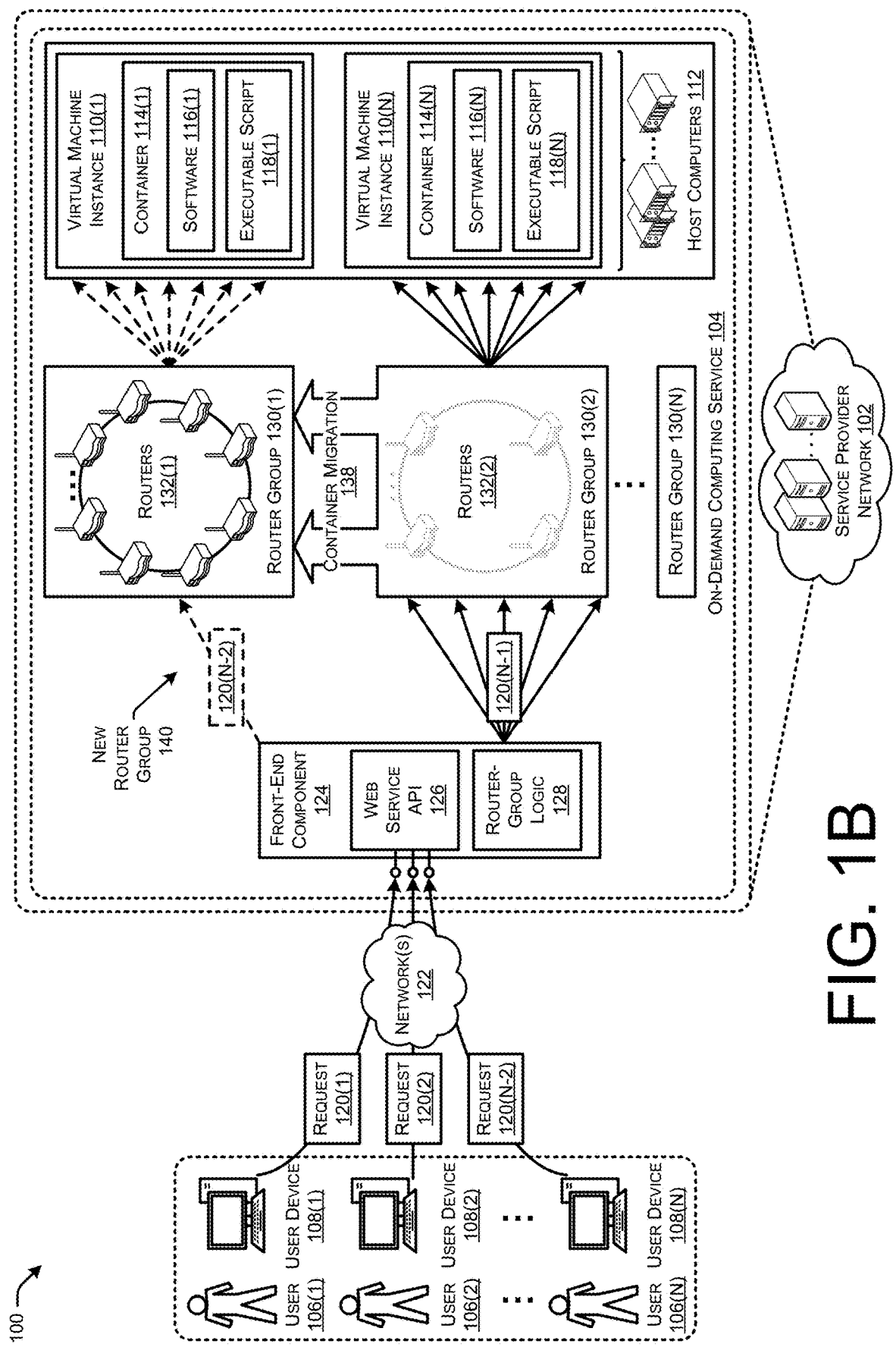
FIG. 1B illustrates a system-architecture diagram of an example environment in which a service provider network dynamically selects between router groups of an on-demand computing service based partly on a number of concurrent requests from a user account dropping below a threshold.

FIG. 1B illustrates a system-architecture diagram of an example environment in which the service provider network 100 dynamically selects between router groups 132 of an on-demand computing service 104 based partly on a number of concurrent requests 120 from a user account dropping below a threshold.

Following the example from FIG. 1A, the front-end component 124 and/or the routers 132 may determine that the number of concurrent requests 120 being managed by routers 132(2) in the router group 130(2) has dropped back below the threshold of concurrent requests 120 for transitioning between router group 130(1) and 130(2). In such examples, the front-end component 124 may then determine that router group 130(1) is to begin managing the requests 120 for the particular user account. For instance, the number of requests 120(N-1) may drop below the threshold, and the front-end component 124 may cause incoming requests 120(N-2) to be sent to the router group 130(1) to be managed by a router 132(1) in the router group 130(1). Similarly, the routers 132(2) in router group 130(2) may perform another container migration 138 to further transition the management of the containers 114 executing the concurrent requests 120 to the new router group 140. In this way, the front-end component 124 and/or the routers 132 themselves may transition the management of requests 120 from a particular user account between router groups 130 based on the number of concurrent requests 120 being managed for the user account.

In some instances, user accounts may be mapped to default, or more dedicated router groups 130 based on the static, concurrency limits for their user accounts. For instance, if a user account has registered or subscribed for concurrent processing of 150 requests, that user account may be mapped to a router group 130 configured to manage user accounts that have concurrency limits between 100 and 500.

In some examples, the container migration 136 and/or container migration 138 may be performed or triggered based on changes in concurrency information for a user account. For example, the user account may change the maximum number of concurrent requests 120 that can be services or processed. The user account may decide they are not utilizing the maximum number of concurrent requests 120 for their account, and request that the maximum number be reduced. Alternatively, the user account may determine that they utilize more than their currently subscribed maximum number of concurrent requests 120, and pay for, or otherwise request, that the maximum number of concurrent requests 120 that can be processed for their user account be increased. Following the above example, if the user account changes their concurrency limit from 150 to 600, the mapping of their user account may be moved to, or mapped to, a router group 130 that manages concurrent request from 501-2000 and has routers 132 that are more dedicated for user accounts. Thus, the container migration 136 may be triggered based on changes in user account information for concurrency limits.

Figure 2:
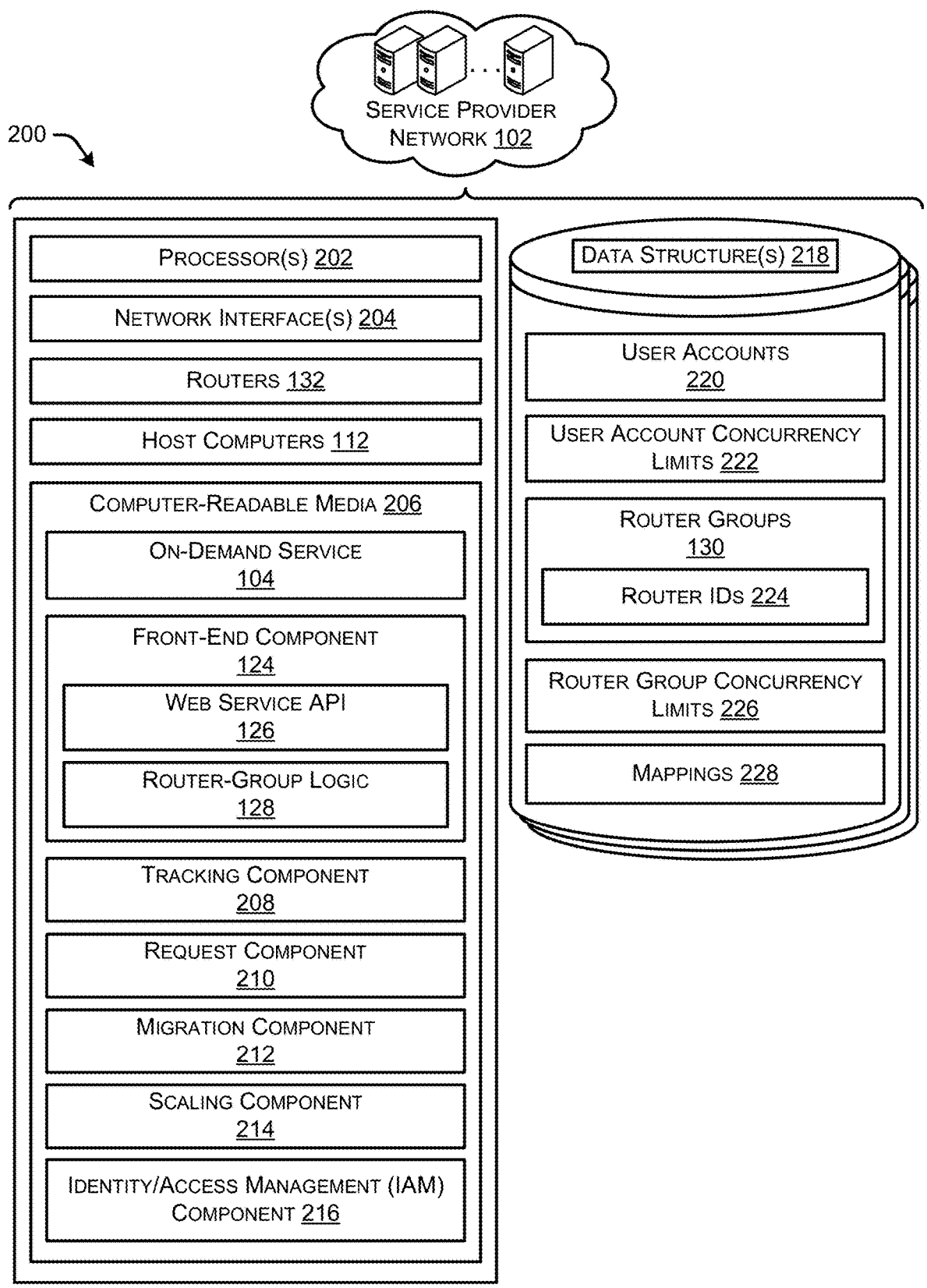
FIG. 2 illustrates a component diagram of an example service provider network that includes components to dynamically select between router groups of an on-demand computing service.

FIG. 2 illustrates a component diagram 200 of an example service provider network 102 that includes components to dynamically select between router groups 132 of an on-demand computing service 104.

As illustrated, the service provider network 102 may include one or more hardware processors 202 (processors) configured to execute one or more stored instructions. The processor(s) 202 may comprise one or more cores. Further, the service provider network 102 may include one or more network interfaces 204 configured to provide communications between the service provider network 102 and other devices, such as the user device(s) 108. The network interfaces 204 may include devices configured to couple to personal area networks (PANs), wired and wireless local area networks (LANs), wired and wireless wide area networks (WANs), and so forth. For example, the network interfaces 204 may include devices compatible with Ethernet, Wi-Fi™, and so forth.

Additionally, the service provider network 102 may include hardware components, such as routers 132 which may comprise networking devices that forward data packets (e.g., requests 120) between computing devices and/or computing networks. The routers 132 may perform traffic directing for data transmitted over one or more networks, such as requests 120 that originate at user devices 108 and are routed or sent to host computers 112 to be executed in containers 114.

The service provider network 102 may also include computer-readable media 206 that stores various executable components (e.g., software-based components, firmware-based components, etc.). As illustrated, the service provider network 102 may include various components discussed in FIGS. 1A and 1B that are executable by the processor(s) 202, such as the on-demand service 104, the front-end component 124 and its sub-components the web service API 126 and router-group logic 128.

In addition to various components discussed in FIGS. 1A and 1B, the computer-readable-media 206 may further store components to implement functionality described herein. For example, the computer-readable media 206 may store a tracking component 208, a request component 210, a migration component 212, a scaling component 214, and an identify/access management (IAM) component 216.

The tracking component 208 may be included in, or associated with, the front-end component 124 and perform operations for determining, for each user account 220, a number of concurrent requests 120 being managed by routers 132 in a router group 130. For instance, the tracking component 208 may identify the requests 120 as they are received at the web service API 126, determine the requests by prompting, or being notified, by the routers 132 themselves, and/or any other technique. The request component 210 may also be included in, or associated with, the front-end component 124 and perform operations for routing requests 120 between user devices 108 and the routers 132, as described in FIGS. 1A and 1B. Further, the migration component 212 may cause the routers 132 to migrate the containers 114, and potentially help facilitate the migration (e.g., container migration 136, container migration 138, etc.).

The scaling component 214 may comprise load balancing software that delivers automatic failover, load balancing, read/write split, instant scalability of resources, and other scaling services. In some examples, the scaling component 214 may scale up, or scale down, the number of containers 114 and/or VM instances 110 based on the incoming traffic, such as the number of requests 120 and/or the type of requests 120. Similarly, the scaling component 214 may scale up, or scale down, the number of routers 132 based on the incoming traffic of requests 120. For example, the scaling component 214 may determine concurrency limits for routers 132 in a router group 130 for a user account, and scale up or down the number of routers based on the number of routers that are being utilized, the incoming traffic, and the concurrency limits for the router groups 130.

The computer-readable media 206 may further store the IAM component 216, which is executable by the processor(s) 202 to perform various operations. For example, to utilize the services provided by the service provider 112, a user may register for an account with the service provider network 102. For instance, users may utilize their devices 108 to interact with the IAM component 266 that allows the users to create user accounts 220 with the service provider network 102. Generally, the IAM component 216 may enable users to manage access to their cloud-based services and computing resources securely. Using the IAM component 216, users can provide input, such as requests 120 for use of the service provider network 102. Each user that is permitted to interact with services associated with a particular account 220 may have a user identity/profile assigned to them. In this way, users may log in with sign-in credentials to their account(s) 220, perform operations, such as submitting a request 120 to execute a command in a container 114 of a VM instance 110.

The service provider network 102 may include one or more data structures 218 for managing data. The data structures 218 may be stored in any type of memory on any device described herein, and may be utilized for data organizing, management, and storage. In some examples, the data structures 218 may be a collection of data, relationships between the data, and functions or operations that can be applied to the data. The data structures 218 may include indications of the user accounts 220, and associated user account concurrency limits 222. For example, each user account 220 may register for number of resources, or limits on resources, that they want to have available to scale up to, or down from, to execute concurrent requests 120. Further, the data structure(s) 218 may store indications of the router groups 130, or mappings that define the router IDs 224 that are members of the router groups 130. In some examples, the router IDs 224 may be mapped to a router group 130 using consistent hashing. Further, the data structure(s) 218 may define router group concurrency limits 226, or limits on the number of concurrent requests 120 that (i) the routers 132 in the group 130 are allowed to, or configured to, manage for a particular user account 220, and/or (ii) the number of concurrent requests 120 that the router group 130 as a whole is configured to manage for a particular user account 220. Further, the data structure(s) 218 may include various mappings 228, such as those described in FIG. 3.

Figure 3:
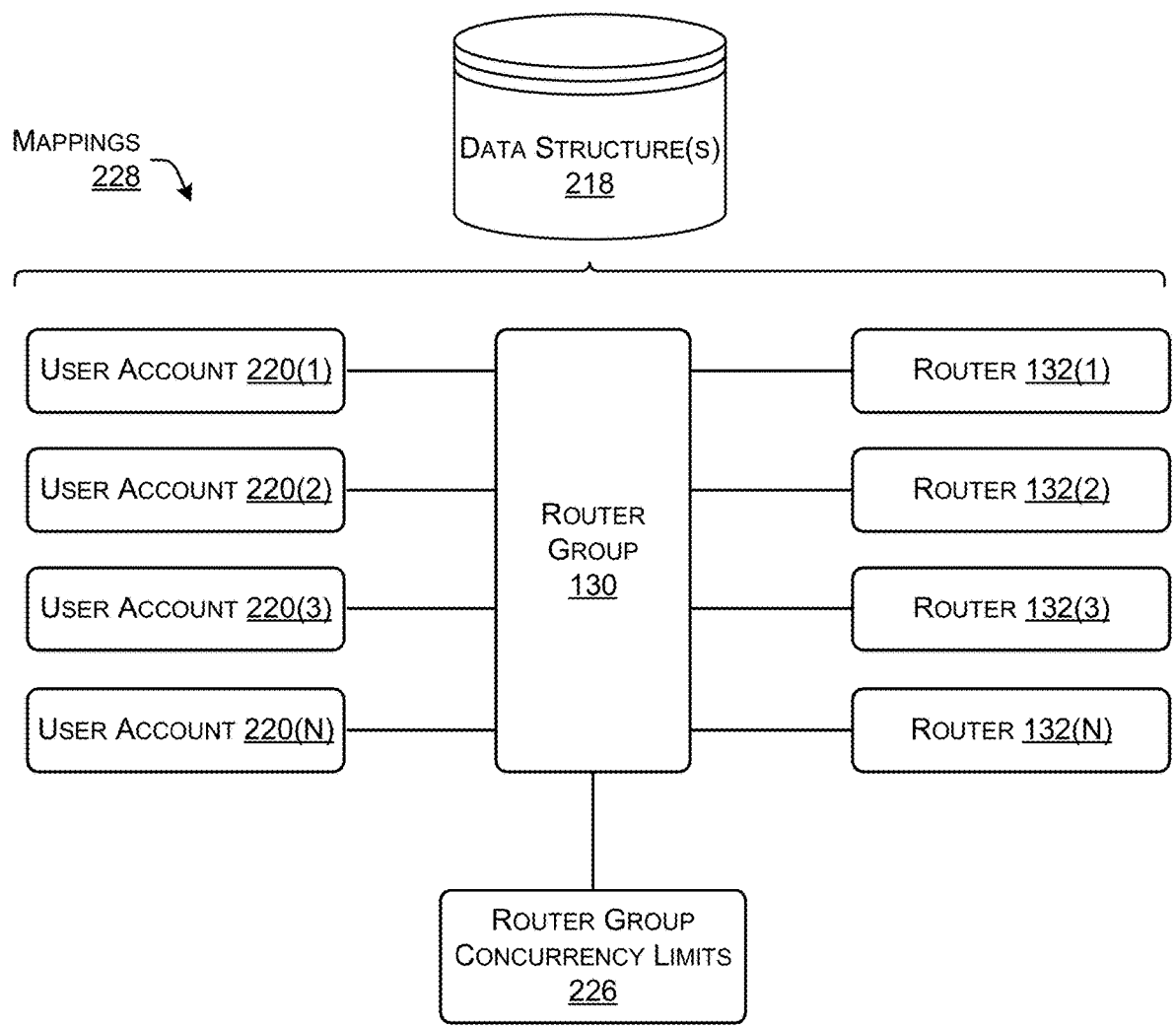
FIG. 3 illustrates example mappings between user accounts, router groups and routers in an on-demand computing service.

FIG. 3 illustrates example mappings 228 between user accounts 220, a router group 130, and routers 132 in an on-demand computing service 104. In some examples, the user accounts 220 may be assigned to, or mapped to, a router group 130 based at least in part on the user account concurrency limits 222 and/or router group concurrency limits 226. For instance, the user accounts 220 may be statically mapped to a router group 130 based on their use account concurrency limits 222 be under, or near, the router group concurrency limits 226. In some examples, the user accounts 220 may be dynamically mapped to a router group 130 based on the number of concurrent requests 120. The user accounts 220 may be associated with, or mapped to, the router group 130 using consistent hashing via one or more hash tables defined in the data structure(s) 218.

Similarly, the router group 130 may include, be associated with, or mapped to, routers 132, such as by using router IDs 224. In this way, routers 132 may be assigned to a router group 130 that is mapped to, or associated with, a router group concurrency limits 226. In this way, the routers 132 may be configured to manage, for each user account 220, no more than a number of concurrent requests 120 than the router group concurrency limits 226 for the router group 130.

FIGS. 4A, 4B, 5, and 6 illustrate flow diagrams of example methods 400, 500, and 600 that illustrate aspects of the functions performed at least partly by the communications service 110 as described in FIGS. 1-3B. The logical operations described herein with respect to FIGS. 4A, 4B, 5, and 6 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 4A, 4B, 5, and 6 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

Figure 4A:
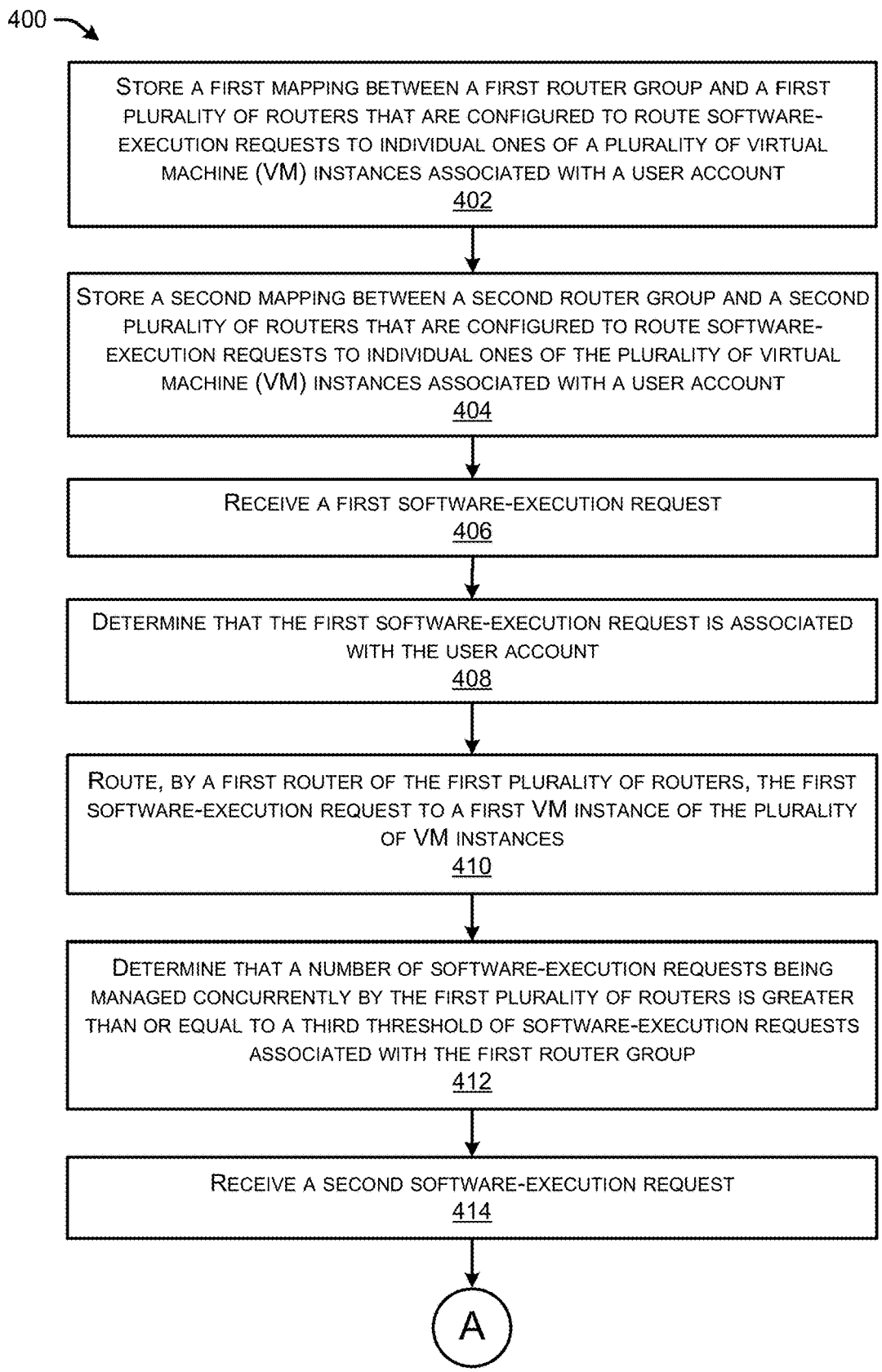
FIGS. 4A and 4B illustrate a flow diagram of an example method performed by a service provider network for dynamically selecting between router groups of a computing service, routing new requests through a newly selected router group, and migrating containers to be managed by the newly selected router group.
Figure 4B:
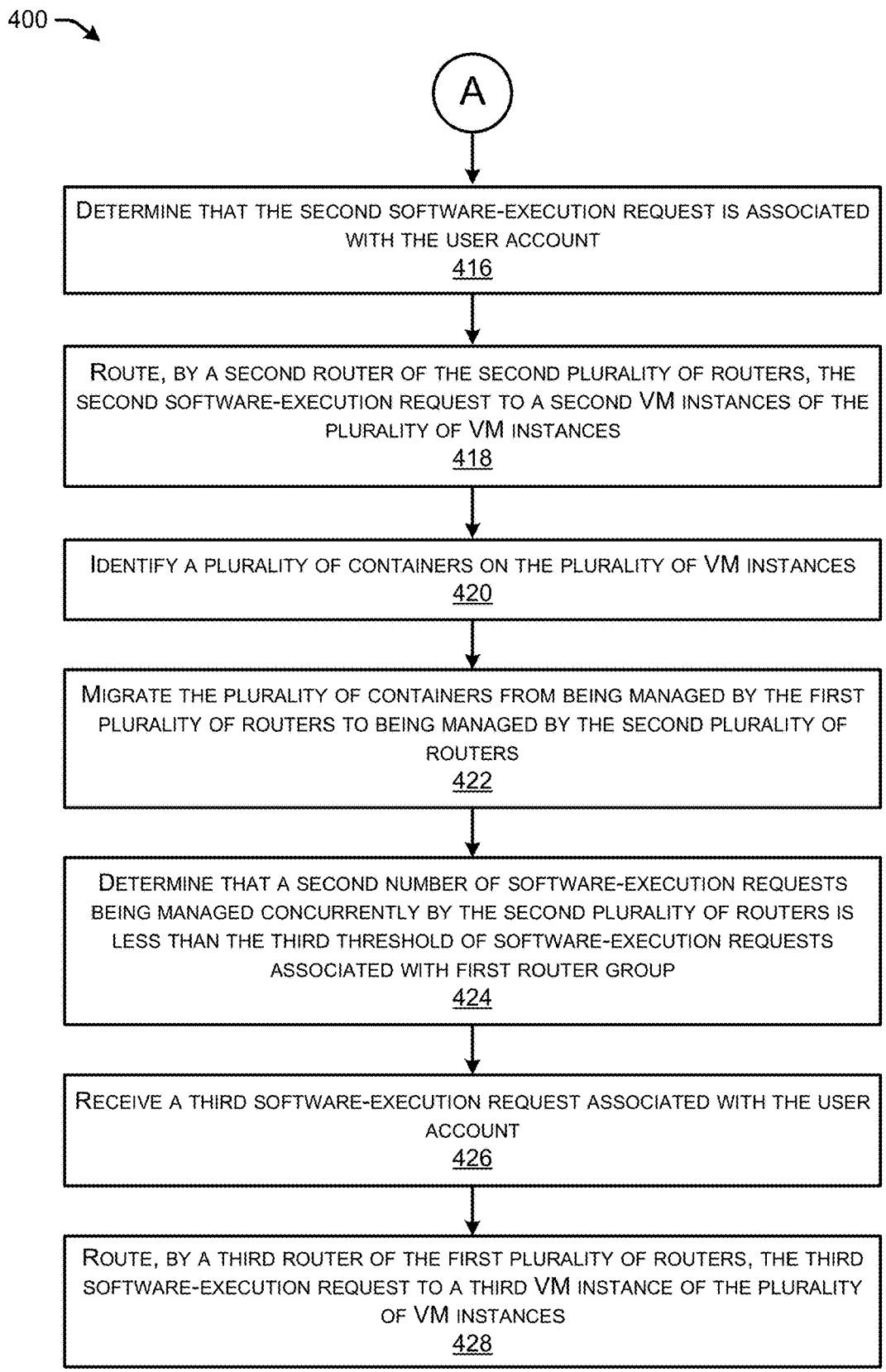

FIGS. 4A and 4B illustrate a flow diagram of an example method 400 performed by a service provider network for dynamically selecting between router groups of a computing service, routing new requests through a newly selected router group, and migrating containers to be managed by the newly selected router group.

At 402, the service provider network 102 may store a first mapping between a first router group and a first plurality of routers that are configured to route software-execution requests to individual ones of a plurality of virtual machine (VM) instances associated with a user account. In some examples, individual VM instances of the plurality of VM instances are configured to execute software to service the software-execution requests, and individual routers of the first plurality of routers are configured to manage no more than a first threshold of software-execution requests.

At 404, the service provider network 102 may store a second mapping between a second router group and a second plurality of routers that are configured to route software-execution requests to individual ones of the plurality of VM instances associated with the user account. In some examples, individual routers of the second plurality of routers are configured to manage no more than a second threshold of software-execution requests, the second threshold being greater than the first threshold.

At 406, the service provider network 102 may receive a first software-execution request. At 408, the service provider network 102 may determine that the first software-execution request is associated with the user account.

At 410, the service provider network 102 may, based at least in part on the first software-execution request being associated with the user account, route, by a first router of the first plurality of routers, the first software-execution request to a first VM instance of the plurality of VM instances.

At 412, the service provider network 102 may determine that a number of software-execution requests being managed concurrently by the first plurality of routers is greater than or equal to a third threshold of software-execution requests associated with the first router group.

At 414, the service provider network 102 may receive a second software-execution request. At 416, the service provider network 102 may determine that the second software-execution request is associated with the user account.

At 418, the service provider network 102 may, based at least in part on the number of software-execution requests being managed concurrently being greater than or equal to the third threshold of software-execution requests, route, by a second router of the second plurality of routers, the second software-execution request to a second VM instance of the plurality of VM instances.

In some examples, the process 400 may further process to 420. At 420, the service provider network 102 may identify a plurality of containers on the plurality of VM instances, individual containers of the plurality of containers executing the software to service individual software-execution requests At 422, the service provider network 102 may, based at least in part on the number of software-execution requests being managed concurrently by the first plurality of routers being greater than or equal to the third threshold, migrate the plurality of containers from being managed by the first plurality of routers to being managed the second plurality of routers.

At 424, the service provider network 102 may determine that a second number of software-execution requests being managed concurrently by the second plurality of routers is less than the third threshold of software-execution requests associated with the first router group.

At 426, the service provider network 102 may receive a third software-execution request associated with the user account. At 428, the service provider network 102 may route, by a third router of the first plurality of routers, the third software-execution request to a third VM instance of the plurality of VM instances.

At 428, the service provider network 102 may route, by a third router of the first plurality of routers, the third software-execution request to a third VM instance of the plurality of VM instances.

In some examples, the method/process 400 may further include identifying a plurality of containers on the plurality of VM instances, where individual containers of the plurality of containers are executing the software to service individual software-execution requests. Additionally, the method 400 may include, based at least in part on the number of software-execution requests being managed concurrently by the first plurality of routers being greater than or equal to the third threshold, migrating the plurality of containers from being managed by the first plurality of routers to being managed the second plurality of routers.

The process 400 may additionally include determining that a second number of software-execution requests being managed concurrently by the second plurality of routers is less than the third threshold of software-execution requests associated with the first router group. In such examples, the service provider network 102 may receive a third software-execution request associated with the user account, and route, by a third router of the first plurality of routers, the third software-execution request to a third VM instance of the plurality of VM instances.

In some instances, the method 400 performed by the service provider network may further include determining that the first router is concurrently managing another number of software-execution requests that is greater than or equal to the first threshold, and determining that the second plurality of routers of the second router group are to route subsequent software-execution requests to the plurality of VM instances.

Figure 5:
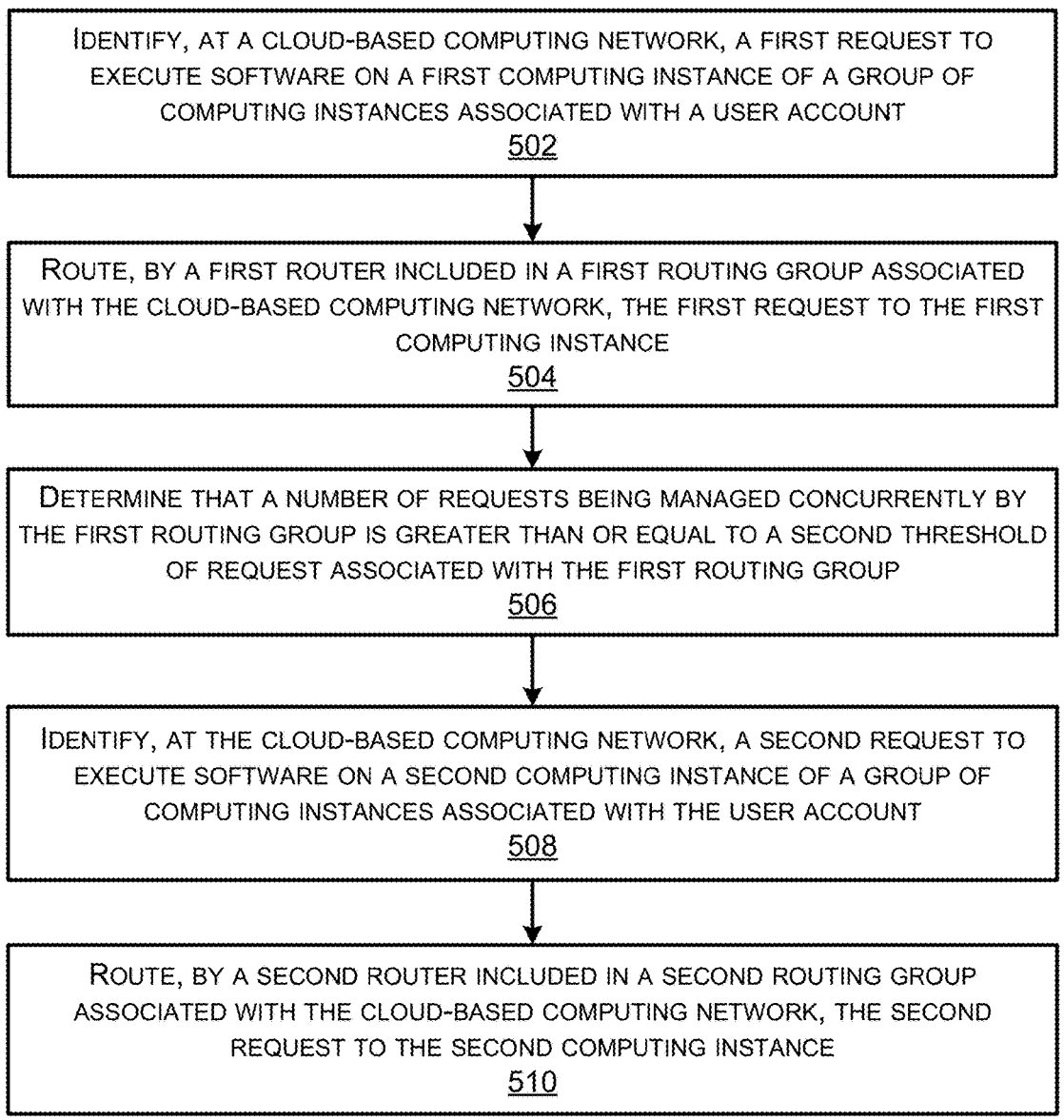
FIG. 5 illustrates a flow diagram of an example method performed by a service provider network for dynamically selecting between router groups of a computing service and routing new requests through a newly selected router group.

FIG. 5 illustrates a flow diagram of an example method 500 performed by a service provider network for dynamically selecting between router groups of a computing service and routing new requests through a newly selected router group.

At 502, the service provider network 102 may identify first request to execute software on a first computing instance of a group of computing instances associated with a user account.

At 504 the service provider network 102 may route, by a first router included in a first router group associated with the service provider network 102, the first request to the first computing instance. In some examples, individual routers included in the first router group are configured to manage no more than a first threshold of requests to execute software on the group of computing instances.

At 506, the service provider network 102 may determine that a number of requests being managed concurrently by the first router group is greater than or equal to a second threshold of requests associated with the first router group.

At 508, the service provider network 102 may identify a second request to execute software on a second computing instance of a group of computing instances associated with the user account.

At 510, the service provider network 102 may, based at least in part on the number of the requests being managed concurrently by the first router group being greater than or equal to the second threshold, route, by a second router included in a second router group, the second request to the second computing instance, wherein individual routers included in the second router group are configured to manage no more than a third threshold of requests that is greater than the first threshold of requests.

In some instances, the method 500 may be performed for a messaging service, also include receiving, from a first user device associated with the user account, message data, storing the message data in a messaging queue associated with the user account, and receiving, from a second user device associated with the user account, the first request to execute software. In such examples, the first request to execute the software on the first computing instance comprises instructions to retrieve the message data from the messaging queue and send the message data to the second device.

In some instances, the method 500 may include determining a second number of requests permitted to be serviced by the group of computing instances for the user account, determining a first number of routers in the first router group based at least in part on the second number of requests and the first threshold of requests, determining a second number of routers in the second router group based at least in part on the second number of requests and the third threshold of requests, storing a first association between the first number of routers in the first router group and the user account, and storing a second association between the second number of routers in the second router group and the user account.

In some examples, the method 500 may be performed by a service provider network 102 and include identifying a number of routers allocated for use by the user account, and determining, based at least in part on the number of routers and the first threshold of requests for individual routers included in the first router group, the second threshold of requests associated with the first router group.

In some examples, the method 500 may be performed by the service provider network 102 and may further include identifying a group of containers in which the software executes to service the number of the requests, individual containers of the group of containers being stored on respective individual computing instances of the group of computing instances. In such examples, based at least in part on the number of the requests being managed concurrently by the first router group being greater than or equal to the second threshold, the method 500 may include migrating the group of the containers from being managed by the first router group to being managed by the second router group.

Further, the service provider network 102 may perform addition steps or functions in the method 500 including determining, based at least in part on the third threshold of requests that the routers in the second router group are configured to manage, a number of routers associated with the second router group to manage the number of requests. In such examples, the migrating the group of the containers to being managed by the second group includes causing the number of routers associated with the second router group to manage the group of containers.

Figure 6:
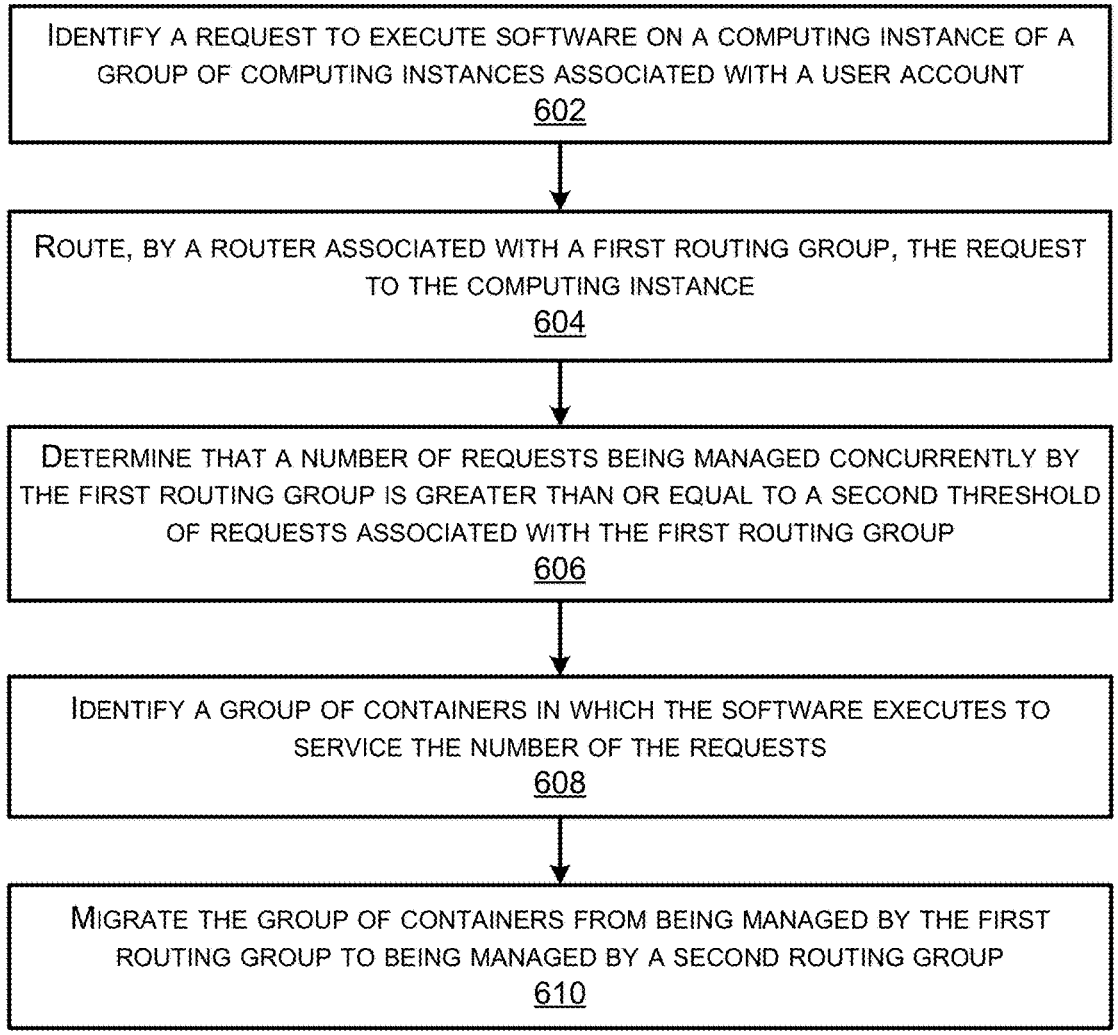
FIG. 6 illustrates a flow diagram of an example method performed by a service provider network for dynamically selecting between router groups of a computing service and migrating containers to be managed by the newly selected router group.

FIG. 6 illustrates a flow diagram of an example method 600 performed by a service provider network for dynamically selecting between router groups of a computing service and migrating containers to be managed by the newly selected router group.

At 602, the service provider network 102 may identify a request to execute software on a computing instance of a group of computing instances associated with a user account. At 604, the service provider network 102 may route, by a router associated with a first router group, the request to the computing instance, wherein individual routers associated with the first router group are configured to manage no more than a first threshold of requests to execute software on the group of computing instances.

At 606, the service provider network 102 may determine that a number of requests being managed concurrently by the first router group is greater than or equal to a second threshold of requests associated with the first router group.

At 608, the service provider network 102 may identify a group of containers in which the software executes to service the number of the requests, individual containers of the group of containers being stored on respective individual computing instances of the group of computing instances.

At 610, the service provider network 102 may, based at least in part on the number of requests being managed concurrently by the first router group being greater than or equal to the second threshold of requests, migrate the group of containers from being managed by the first router group to being managed by a second router group, wherein individual routers associated with the second router group are configured to manage no more than a third threshold of requests that is greater than the first threshold of requests.

In some examples, the method 600 may further include identifying a second request to execute software on a second computing instance of a group of computing instances associated with the user account, and based at least in part on the number of requests being managed concurrently by the first router group being greater than or equal to the second threshold, routing, by a second router associated with the second router group, the second request to the second computing instance. Further, the method 600 may include, based at least in part on the second number of requests being managed concurrently by the second router group being less than or equal to the second threshold of requests, migrate a second group of containers from being managed by the second router group to being managed by the first router group.

In some examples, the method 600 may further include identifying a number of routers allocated for use by the user account, and determining, based at least in part on the number of routers and the first threshold of requests for individual routers included in the first router group, the second threshold of requests associated with the first router group.

Figure 7:
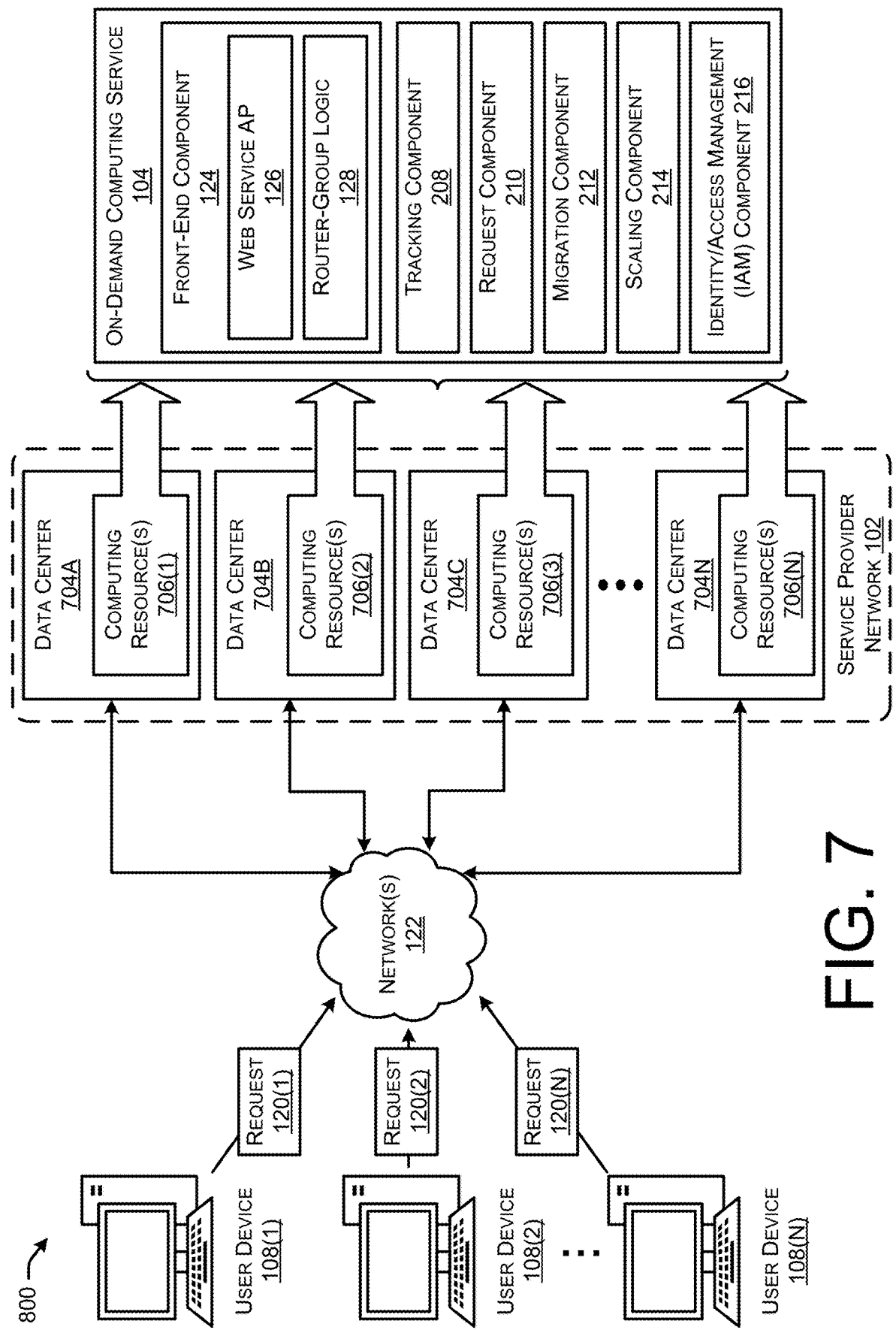
FIG. 7 illustrates a system and network diagram that shows an illustrative operating environment that includes a service provider network that can be configured to implement aspects of the functionality described herein.

FIG. 7 is a system and network diagram that shows an illustrative operating environment 700 that includes a service-provider network 102 (that may be part of or associated with a cloud-based service network/platform such as service provider network 102) that can be configured to implement aspects of the functionality described herein.

The service-provider network 702 can provide computing resources 706, like VM instances 110 and storage, on a permanent or an as-needed basis. Among other types of functionality, the computing resources 706 provided by the service-provider network 702 may be utilized to implement the various services described above. The computing resources provided by the service-provider network 702 can include various types of computing resources, such as data processing resources like VM instances, data storage resources, networking resources, data communication resources, application-container/hosting services, network services, and the like.

Each type of computing resource provided by the service-provider network 702 can be general-purpose or can be available in a number of specific configurations. For example, data processing resources can be available as physical computers or VM instances 110 in a number of different configurations. The VM instances 110 can be configured to execute applications, including web servers, application servers, media servers, database servers, some or all of the network services described above, and/or other types of programs. Data storage resources can include file storage devices, block storage devices, and the like. The service-provider network 702 can also be configured to provide other types of computing resources not mentioned specifically herein.

The computing resources 706 provided by the service-provider network 702 may be enabled in one embodiment by one or more data centers 704A-704N (which might be referred to herein singularly as "a data center 704" or in the plural as "the data centers 704"). The data centers 704 are facilities utilized to house and operate computer systems and associated components. The data centers 704 typically include redundant and backup power, communications, cooling, and security systems. The data centers 704 can also be located in geographically disparate locations. One illustrative embodiment for a data center 704 that can be utilized to implement the technologies disclosed herein will be described below with regard to FIG. 8.

The data centers 704 may be configured in different arrangements depending on the service-provider network 702. For example, one or more data centers 704 may be included in or otherwise make-up an availability zone. Further, one or more availability zones may make-up or be included in a region. Thus, the service-provider network 702 may comprise one or more availability zones, one or more regions, and so forth. The regions may be based on geographic areas, such as being located within a predetermined geographic perimeter.

The users 106 and/or admins of the service-provider network 702 may access the computing resources 706 provided by the data centers 704 of the service-provider network 702 over any wired and/or wireless network(s) 122 (utilizing a user device 108 and/or another accessing-user device), which can be a wide area communication network ("WAN"), such as the Internet, an intranet or an Internet service provider ("ISP") network or a combination of such networks. For example, and without limitation, a device operated by a user of the service-provider network 702 may be utilized to access the service-provider network 702 by way of the network(s) 122. It should be appreciated that a local-area network ("LAN"), the Internet, or any other networking topology known in the art that connects the data centers 704 to remote clients and other users can be utilized. It should also be appreciated that combinations of such networks can also be utilized.

As illustrated in FIG. 7, the service-provider network 702 may be configured to support some or all of the components of the on-demand computing service 104. For example, the computing resources 706 in one or all of the data centers 704 may provide the resources to store and/or execute the components of the on-demand computing service 104. In addition to supporting the components of the on-demand computing service 104, the computing resources 706 may include host computers 112 for supporting VM instances 110 that execute the containers 114.

Figure 8:
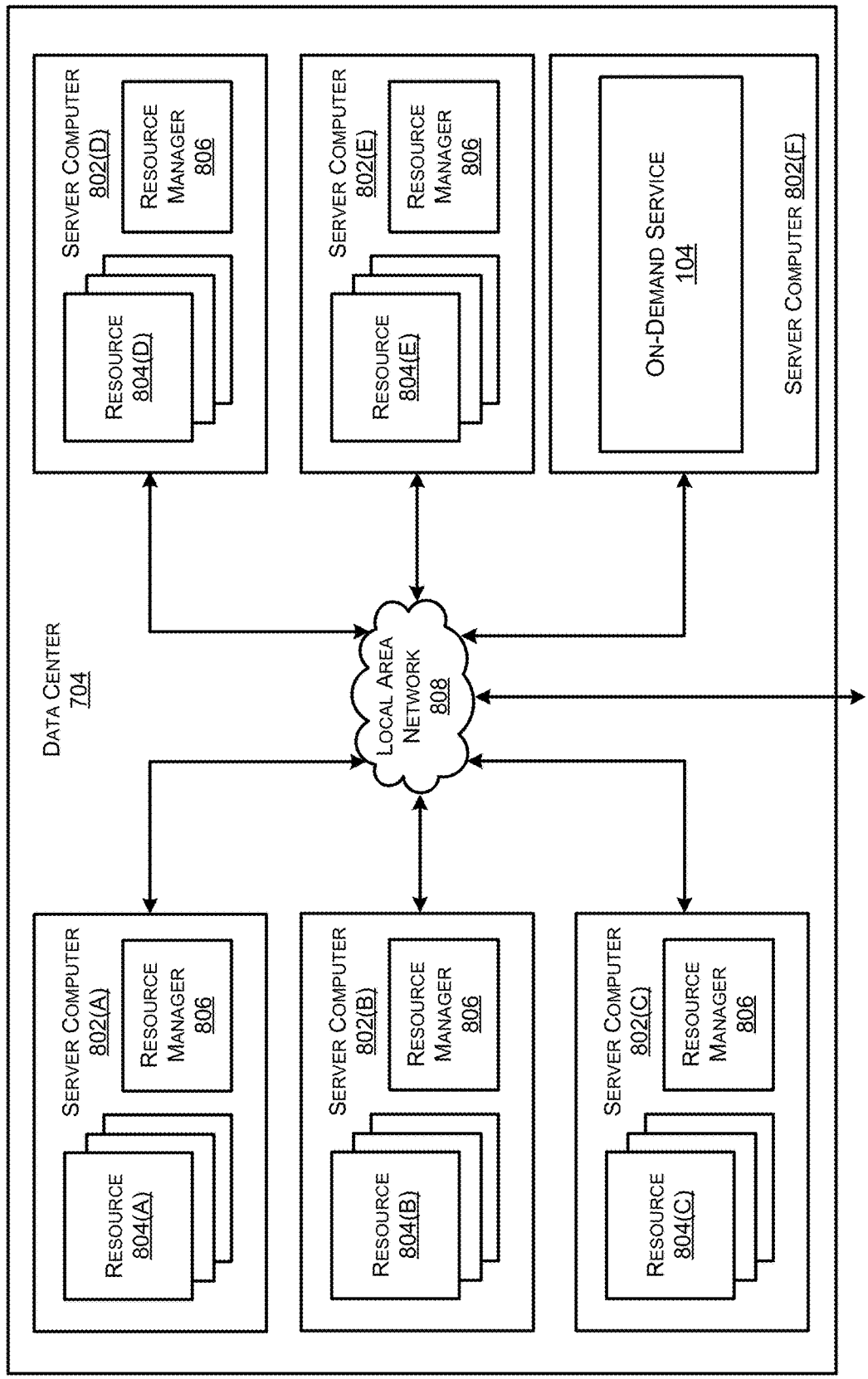
FIG. 8 illustrates a computing system diagram illustrating a configuration for a data center that can be utilized to implement aspects of the technologies disclosed herein.

FIG. 8 is a computing system diagram illustrating a configuration for a data center 704 that can be utilized to implement aspects of the technologies disclosed herein. The example data center 704 shown in FIG. 8 includes several server computers 802A-802F (which might be referred to herein singularly as "a server computer 802" or in the plural as "the server computers 802") for providing computing resources 804A-804E. In some examples, the resources 804 and/or server computers 802 may include, or correspond to, the computing resources 706 described herein.

The server computers 802 can be standard tower, rack-mount, or blade server computers configured appropriately for providing the computing resources described herein (illustrated in FIG. 8 as the computing resources 804A-804E). As mentioned above, the computing resources provided by the service-provider network 802 can be data processing resources such as VM instances or hardware computing systems, database clusters, computing clusters, storage clusters, data storage resources, database resources, networking resources, and others. Some of the servers 802 can also be configured to execute a resource manager 806 capable of instantiating and/or managing the computing resources. In the case of VM instances 110, for example, the resource manager 806 can be a hypervisor or another type of program configured to enable the execution of multiple VM instances on a single server computer 802. Server computers 802 in the data center 704 can also be configured to provide network services and other types of services.

In the example data center 704 shown in FIG. 8, an appropriate LAN 808 is also utilized to interconnect the server computers 802A-802F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between each of the data centers 804A-804N, between each of the server computers 802A-802F in each data center 704, and, potentially, between computing resources in each of the server computers 802. It should be appreciated that the configuration of the data center 704 described with reference to FIG. 8 is merely illustrative and that other implementations can be utilized.

Figure 9:
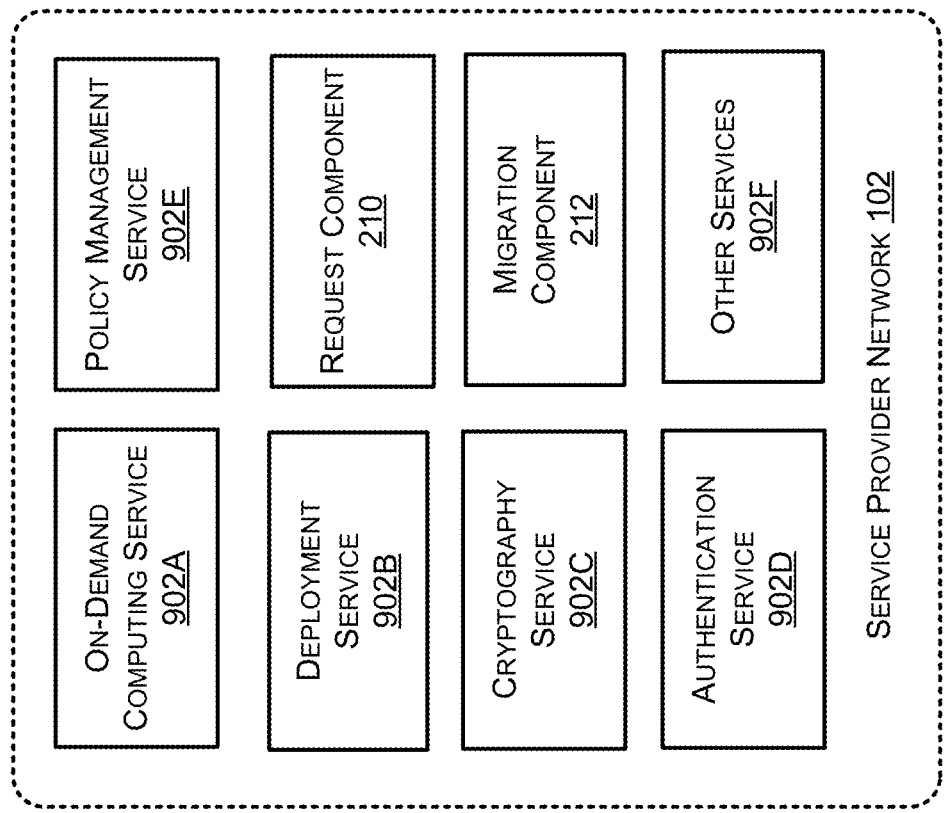
FIG. 9 illustrates a system and network diagram that shows aspects of several services that might be provided by and utilized within a service provider network in one configuration disclosed herein.

FIG. 9 illustrates a system and network diagram that shows aspects of several services that might be provided by and utilized within a service provider network in one configuration disclosed herein.

As discussed above, the on-demand computing service 104 may be a collection of computing resources configured to instantiate VM instances 110 and to provide other types of computing resources on demand. For example, a customer or other user of the service provider network 102 may interact with the on-demand computing service 104 (via appropriately configured and authenticated API calls) to provision and operate VM instances 110 that are instantiated on physical computing devices hosted and operated by the service provider network 102. The VM instances 110 may be used for various purposes, such as to operate as servers supporting a web site, to operate business applications or, generally, to serve as computing resources for the customer. Other applications for the VM instances 110 may be to support database applications, electronic commerce applications, business applications and/or other applications. Although the on-demand computing service 104 is shown in FIG. 9, any other computer system or computer system service may be utilized in the service provider network 102, such as a computer system or computer system service that does not employ virtualization and instead provisions computing resources on dedicated or shared computers/servers and/or other physical devices.

The storage service 902A might include software and computing resources that collectively operate to store data using block or file-level storage devices (and/or virtualizations thereof). The storage devices of the storage service 902A might, for instance, be operationally attached to virtual computer systems provided by the on-demand computing service 104 to serve as logical units (e.g., virtual drives) for the computer systems. A storage device might also enable the persistent storage of data used/generated by a corresponding virtual computer system where the virtual computer system service might only provide ephemeral data storage.

The service provider network 102 may also include a cryptography service 902C. The cryptography service 902C may utilize storage services of the service provider network 102, such as the storage service 902A, to store encryption keys in encrypted form, whereby the keys may be usable to decrypt customer keys accessible only to particular devices of the cryptography service 902C. The cryptography service 902C might also provide other types of functionality not specifically mentioned herein.

As illustrated in FIG. 9, the service provider network 102, in various configurations, also includes an authentication service 902D and a policy management service 902E. The authentication service 902D, in one example, is a computer system (i.e., collection of computing resources) configured to perform operations involved in authentication of users. For instance, one of the services 902 shown in FIG. 9 may provide information from a user to the authentication service 902D to receive information in return that indicates whether or not the requests submitted by the user are authentic.

The policy management service 902E, in one example, is a network service configured to manage policies on behalf of customers or internal users of the service provider network 102. The policy management service 902E may include an interface that enables customers to submit requests related to the management of policy. Such requests may, for instance, be requests to add, delete, change or otherwise modify policy for a customer, service, or system, or for other administrative actions, such as providing an inventory of existing policies and the like.

The service provider network 102, in various configurations, is also configured with a task service 902F. The task service 902F is configured to receive a task package and to enable executing tasks as dictated by the task package. The task service 902F may be configured to use any resource of the service provider network 102, such as instantiated virtual machines or virtual hosts, for executing the task. The task service 902F may configure the instantiated virtual machines or virtual hosts to operate using a selected operating system and/or a selected execution application in accordance with specified requirements.

The service provider network 102 may additionally maintain other services 902F based, at least in part, on the needs of its customers. For instance, the service provider network 102 may maintain a deployment service 902B for deploying program code and/or a database service in some configurations. A database service may be a collection of computing resources that collectively operate to create, maintain, and allow queries to be performed on databases stored within the service provider network 102. For example, a customer or other user of the service provider network 102 may operate and manage a database from the database service by utilizing appropriately configured network API calls. This, in turn, may allow the customer to maintain and potentially scale the operations in the database. Other services include object-level archival data storage services, and services that manage, monitor, interact with, or support other services. The service provider network 102 might also be configured with other services not specifically mentioned herein in other configurations.

Figure 10:
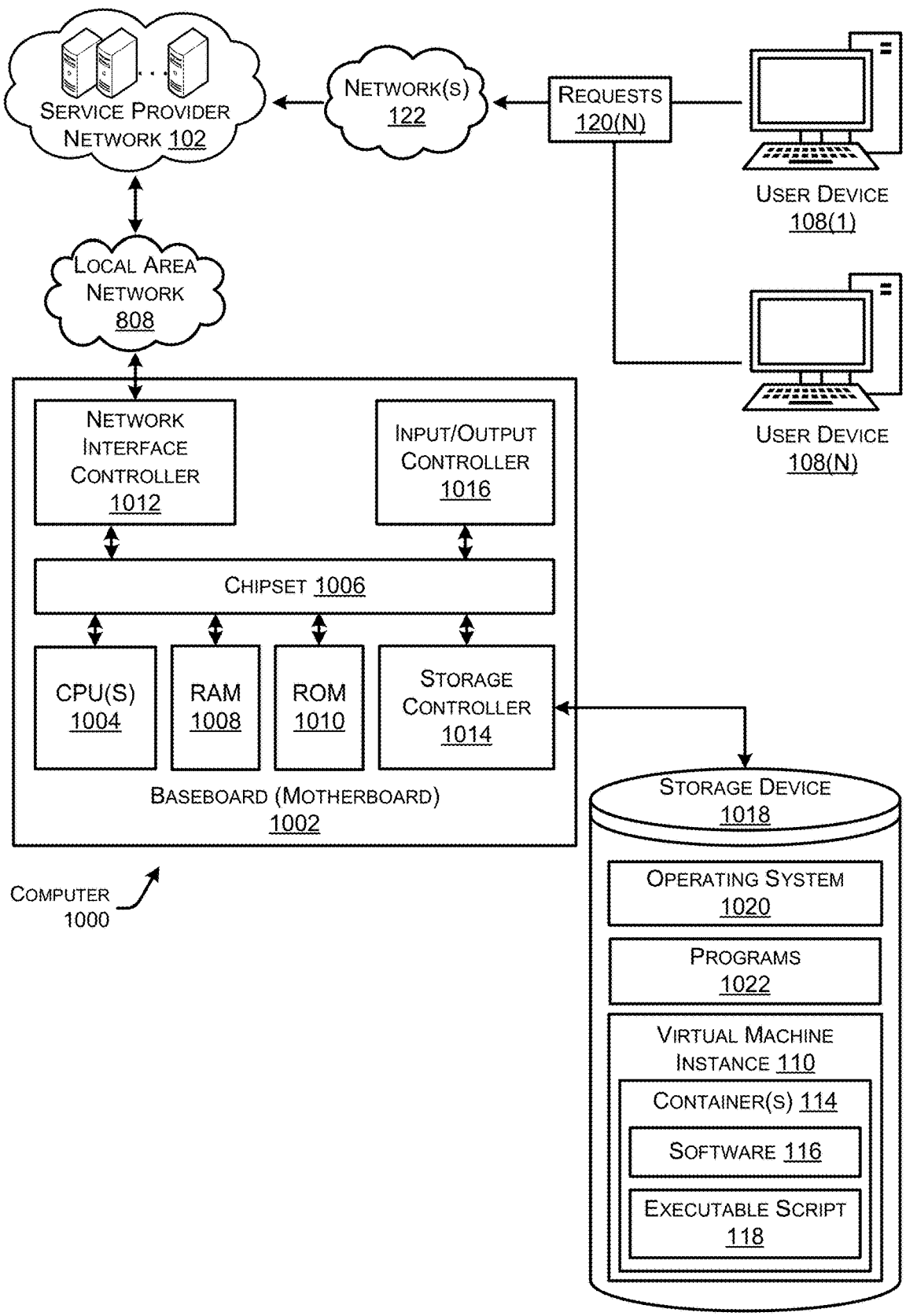
FIG. 10 is a computer architecture diagram showing an illustrative computer hardware architecture for implementing a computing device that can be utilized to implement aspects of the various technologies presented herein.

FIG. 10 shows an example computer architecture for a computer 1000 capable of executing program components for implementing the functionality described above. The computer architecture shown in FIG. 10 illustrates a conventional server computer, workstation, desktop computer, laptop, tablet, network appliance, e-reader, smartphone, or other computing device, and can be utilized to execute any of the software components presented herein.

The computer 1000 includes a baseboard 1002, or "motherboard," which is a printed circuit board to which a multitude of components or devices can be connected by way of a system bus or other electrical communication paths. In one illustrative configuration, one or more central processing units ("CPUs") 1004 operate in conjunction with a chipset 1006. The CPUs 1004 can be standard programmable processors that perform arithmetic and logical operations necessary for the operation of the computer 1000.

The CPUs 1004 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1006 provides an interface between the CPUs 1004 and the remainder of the components and devices on the baseboard 1002. The chipset 1006 can provide an interface to a RAM 1008, used as the main memory in the computer 1000. The chipset 1006 can further provide an interface to a computer-readable storage medium such as a read-only memory ("ROM") 1010 or non-volatile RAM ("NVRAM") for storing basic routines that help to startup the computer 1000 and to transfer information between the various components and devices. The ROM 1010 or NVRAM can also store other software components necessary for the operation of the computer 1000 in accordance with the configurations described herein.

The computer 1000 can operate in a networked environment using logical connections to remote computing devices and computer systems through a network, such as the network 908. The chipset 1006 can include functionality for providing network connectivity through a NIC 1012, such as a gigabit Ethernet adapter. The NIC 1012 is capable of connecting the computer 1000 to other computing devices over the network 908 (or 122). It should be appreciated that multiple NICs 1012 can be present in the computer 1000, connecting the computer to other types of networks and remote computer systems.

The computer 1000 can be connected to a mass storage device 1018 that provides non-volatile storage for the computer. The mass storage device 1018 can store an operating system 1020, programs 1022, and data, which have been described in greater detail herein. The mass storage device 1018 can be connected to the computer 1000 through a storage controller 1014 connected to the chipset 1006. The mass storage device 1018 can consist of one or more physical storage units. The storage controller 1014 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 1000 can store data on the mass storage device 1018 by transforming the physical state of the physical storage units to reflect the information being stored. The specific transformation of physical state can depend on various factors, in different embodiments of this description. Examples of such factors can include, but are not limited to, the technology used to implement the physical storage units, whether the mass storage device 1018 is characterized as primary or secondary storage, and the like.

For example, the computer 1000 can store information to the mass storage device 1018 by issuing instructions through the storage controller 1014 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1000 can further read information from the mass storage device 1018 by detecting the physical states or characteristics of one or more particular locations within the physical storage units.

In addition to the mass storage device 1018 described above, the computer 1000 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 1000. In some examples, the operations performed by the cloud-based service platform 102, and or any components included therein, may be supported by one or more devices similar to computer 1000. Stated otherwise, some or all of the operations performed by the service-provider network 602, and or any components included therein, may be performed by one or more computer devices 1000 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the mass storage device 1018 can store an operating system 1020 utilized to control the operation of the computer 1000. According to one embodiment, the operating system comprises the LINUX operating system. According to another embodiment, the operating system comprises the WINDOWS® SERVER operating system from MICROSOFT Corporation of Redmond, Wash. According to further embodiments, the operating system can comprise the UNIX operating system or one of its variants. It should be appreciated that other operating systems can also be utilized. The mass storage device 1018 can store other system or application programs and data utilized by the computer 1000.

In one embodiment, the mass storage device 1018 or other computer-readable storage media is encoded with computer-executable instructions which, when loaded into the computer 1000, transform the computer from a general-purpose computing system into a special-purpose computer capable of implementing the embodiments described herein. These computer-executable instructions transform the computer 1000 by specifying how the CPUs 1004 transition between states, as described above. According to one embodiment, the computer 1000 has access to computer-readable storage media storing computer-executable instructions which, when executed by the computer 1000, perform the various processes described above with regard to FIGS. 1-9. The computer 1000 can also include computer-readable storage media having instructions stored thereupon for performing any of the other computer-implemented operations described herein.

The computer 1000 can also include one or more input/output controllers 1016 for receiving and processing input from a number of input devices, such as a keyboard, a mouse, a touchpad, a touch screen, an electronic stylus, or other type of input device. Similarly, an input/output controller 1016 can provide output to a display, such as a computer monitor, a flat-panel display, a digital projector, a printer, or other type of output device. It will be appreciated that the computer 1000 might not include all of the components shown in FIG. 10, can include other components that are not explicitly shown in FIG. 10, or might utilize an architecture completely different than that shown in FIG. 10.

In some examples, the computer 1000 may correspond to a host computer 112 and perform similar functionality. For instance, as illustrated in FIG. 10, the computer 1000 may store various components of the host computer 112, such as a VM instance 110 that is executing one or more containers 114. Each of the container(s) 114 may include software 116 and/or an executable script 118 that are executing in the container 114 based on a request 120 received from a user device 108. In some examples, the VM instance 110 may include multiple containers 114 that execute commands according to respective requests 120 received from the user devices 108 over networks 122. In some examples, the computer 1000 may be part of the service provider network 102, such as connected by a LAN 808 within a data center 704.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A system comprising:
   a data structure comprising:
      a first mapping between a first router group and a first plurality of routers that are configured to route software-execution requests to individual ones of a plurality of virtual machine (VM) instances associated with a user account, wherein:
         individual VM instances of the plurality of VM instances are configured to execute software to service the software-execution requests; and
         individual routers of the first plurality of routers are configured to manage no more than a first threshold of software-execution requests; and
      a second mapping between a second router group and a second plurality of routers that are configured to route software-execution requests to individual ones of the plurality of VM instances associated with the user account, wherein:
         individual routers of the second plurality of routers are configured to manage no more than a second threshold of software-execution requests, the second threshold being greater than the first threshold;
   one or more processors; and
   one or more computer-readable media storing computer-executable instructions that, when executed by the one or more processors, cause the one or more processors to:
      receive a first software-execution request;
      determine that the first software-execution request is associated with the user account;
      based at least in part on the first software-execution request being associated with the user account, route, by a first router of the first plurality of routers, the first software-execution request to a first VM instance of the plurality of VM instances;
      determine that a number of software-execution requests being managed concurrently by the first plurality of routers for the user account is greater than or equal to a third threshold of software-execution requests associated with the first router group;
      receive a second software-execution request;
      determine that the second software-execution request is associated with the user account; and
      based at least in part on the number of software-execution requests being managed concurrently being greater than or equal to the third threshold of software-execution requests, route, by a second router of the second plurality of routers, the second software-execution request to a second VM instance of the plurality of VM instances.

2. The system of claim 1, comprising further instructions that, when executed by the one or more processors, cause the one or more processors to:
   identify a plurality of containers on the plurality of VM instances, individual containers of the plurality of containers executing the software to service individual software-execution requests; and
   based at least in part on the number of software-execution requests being managed concurrently by the first plurality of routers being greater than or equal to the third threshold, migrate the plurality of containers from being managed by the first plurality of routers to being managed the second plurality of routers.

3. The system of claim 1, wherein the number of software-execution requests comprises a first number of software-execution requests, comprising further instructions that, when executed by the one or more processors, cause the one or more processors to:
   determine that a second number of software-execution requests being managed concurrently by the second plurality of routers is less than the third threshold of software-execution requests associated with the first router group;
   receive a third software-execution request associated with the user account; and
   route, by a third router of the first plurality of routers, the third software-execution request to a third VM instance of the plurality of VM instances.

4. The system of claim 1, comprising further instructions that, when executed by the one or more processors, cause the one or more processors to:
   determine that the first router is concurrently managing another number of software-execution requests that is greater than or equal to the first threshold; and
   determine that the second plurality of routers of the second router group are to route subsequent software-execution requests to the plurality of VM instances.

5. A computer-implemented method comprising:
   identifying, at a cloud-based computing network, a first request to execute software on a first computing instance of a group of computing instances associated with a user account;
   routing, by a first router included in a first router group associated with the cloud-based computing network, the first request to the first computing instance, wherein individual routers included in the first router group are configured to manage no more than a first threshold of requests to execute software on the group of computing instances;

determining that a number of requests being managed concurrently by the first router group is greater than or equal to a second threshold of requests associated with the first router group;

identifying, at the cloud-based computing network, a second request to execute software on a second computing instance of a group of computing instances associated with the user account; and based at least in part on the number of the requests being managed concurrently by the first router group being greater than or equal to the second threshold, routing, by a second router included in a second router group associated with the cloud-based computing network, the second request to the second computing instance, wherein individual routers included in the second router group are configured to manage no more than a third threshold of requests that is greater than the first threshold of requests.

6. The computer-implemented method of claim 5, further comprising:

identifying a group of containers in which the software executes to service the number of the requests, individual containers of the group of containers being stored on respective individual computing instances of the group of computing instances; and based at least in part on the number of the requests being managed concurrently by the first router group being greater than or equal to the second threshold, migrating the group of the containers from being managed by the first router group to being managed by the second router group.

7. The computer-implemented method of claim 6, further comprising:

determining, based at least in part on the third threshold of requests that the routers in the second router group are configured to manage, a number of routers associated with the second router group to manage the number of requests, wherein the migrating the group of the containers to being managed by the second group includes causing the number of routers associated with the second router group to manage the group of containers.

8. The computer-implemented method of claim 5, wherein the number of requests comprises a first number requests, further comprising:

determining that a second number of requests being managed concurrently by the second router group is less than or equal to the second threshold of requests;

identifying a third request to execute software; and routing, by a third router included in the first router group, the third request to a third computing instance of the group of computing instances.

9. The computer-implemented method of claim 5, wherein the number of requests comprises a first number requests, further comprising determining that the first router is concurrently managing a second number of requests that is greater than or equal to the first threshold.

10. The computer-implemented method of claim 5, wherein determining that the number of requests being managed concurrently by the first router group is greater than or equal to the second threshold of requests associated with the first router group comprises:

determining that a number of routers in the first router group corresponds to a number of routers allocated for use to the user account; and determining that each router in the first router group is concurrently managing a respective number of requests that is greater than or equal to the first threshold.

11. The computer-implemented method of claim 5, further comprising:

identifying a number of routers allocated for use by the user account; and determining, based at least in part on the number of routers and the first threshold of requests for individual routers included in the first router group, the second threshold of requests associated with the first router group.

12. The computer-implemented method of claim 5, further comprising:

receiving, from a first user device associated with the user account, message data;

storing the message data in a messaging queue associated with the user account;

receiving, from a second user device associated with the user account, the first request to execute software, wherein the first request to execute the software on the first computing instance comprises instructions to retrieve the message data from the messaging queue and send the message data to the second device.

13. The computer-implemented method of claim 5, wherein the number of requests comprises a first number of requests, further comprising:

determining a second number of requests permitted to be serviced by the group of computing instances for the user account;

determining a first number of routers in the first router group based at least in part on the second number of requests and the first threshold of requests;

determining a second number of routers in the second router group based at least in part on the second number of requests and the third threshold of requests;

storing a first association between the first number of routers in the first router group and the user account; and storing a second association between the second number of routers in the second router group and the user account.

14. A system comprising:

one or more processors; and one or more computer-readable media storing computer-executable instructions that, when executed by the one or more processors, cause the one or more processors to:

identify a request to execute software on a computing instance of a group of computing instances associated with a user account;

route, by a router associated with a first router group, the request to the computing instance, wherein individual routers associated with the first router group are configured to manage no more than a first threshold of requests to execute software on the group of computing instances;

determine that a number of requests being managed concurrently by the first router group is greater than or equal to a second threshold of requests associated with the first router group;

identify a group of containers in which the software executes to service the number of the requests, individual containers of the group of containers being stored on respective individual computing instances of the group of computing instances; and based at least in part on the number of requests being managed concurrently by the first router group being greater than or equal to the second threshold of requests, migrate the group of containers from being managed by the first router group to being managed by a second router group, wherein individual routers associated with the second router group are configured to manage no more than a third threshold of requests that is greater than the first threshold of requests.

15. The system of claim 14, wherein the request comprises a first request, the computing instance comprises a first computing instance, and the router comprises a first router, comprising further instructions that, when executed by the one or more processors, cause the one or more processors to:

identify a second request to execute software on a second computing instance of a group of computing instances associated with the user account; and based at least in part on the number of requests being managed concurrently by the first router group being greater than or equal to the second threshold, route, by a second router associated with the second router group, the second request to the second computing instance.

16. The system of claim 15, wherein the number of requests comprises a first number requests, comprising further instructions that, when executed by the one or more processors, cause the one or more processors to:

determine that a second number of requests being managed concurrently by the second router group is less than or equal to the second threshold of requests;

identify a third request to execute software; and route, by a third router included in the first router group, the third request to a third computing instance of the group of computing instances.

17. The system of claim 16, wherein the group of containers comprises a first group of containers, comprising further instructions that, when executed by the one or more processors, cause the one or more processors to:

based at least in part on the second number of requests being managed concurrently by the second router group being less than or equal to the second threshold of requests, migrate a second group of containers from being managed by the second router group to being managed by the first router group.

18. The system of claim 14, wherein the number of requests comprises a first number requests, comprising further instructions that, when executed by the one or more processors, cause the one or more processors to determine that the first router is concurrently managing a second number of requests that is greater than or equal to the first threshold of requests.

19. The system of claim 14, comprising further instructions that, when executed by the one or more processors, cause the one or more processors to:

determine that a number of routers in the first router group corresponds to a number of routers allocated for use to the user account; and determine that each router in the first router group is concurrently managing a respective number of requests that is greater than or equal to the first threshold of requests.

20. The system of claim 14, comprising further instructions that, when executed by the one or more processors, cause the one or more processors to:

identifying a number of routers allocated for use by the user account; and determining, based at least in part on the number of routers and the first threshold of requests for individual routers included in the first router group, the second threshold of requests associated with the first router group.

* * * * *